United States Patent [19]
Olsen et al.

[11] 3,942,030
[45] Mar. 2, 1976

[54] ARRANGEMENT FOR DETECTING DIELECTRIC BREAKDOWNS IN METAL-CLAD HIGH-VOLTAGE SWITCHING AND TRANSMISSION INSTALLATIONS

[75] Inventors: Willi Olsen; Manfred Lieske; Wolfgang Ehmann; Dieter Krause; Gerhard Perst, all of Berlin, Germany

[73] Assignee: Siemens Aktiengesellschaft, Munich, Germany

[22] Filed: Mar. 18, 1974

[21] Appl. No.: 452,355

[30] Foreign Application Priority Data
Mar. 23, 1973  Germany............................ 2315322

[52] U.S. Cl................ 307/117; 324/54; 340/248 R
[51] Int. Cl...................... H01h 37/00; H02b 13/02
[58] Field of Search.................... 340/248 R, 248 A; 317/40 R, 13 C, 14 F, 27 R, 9 D, 41, 42; 324/54, 102; 219/69 C, 69 S, 69 R, 510, 511; 307/117

[56] References Cited
UNITED STATES PATENTS

| | | | |
|---|---|---|---|
| 2,304,513 | 12/1942 | Stearns............................ | 340/248 R |
| 2,457,879 | 1/1949 | Earle.......................... | 340/248 R X |
| 3,187,080 | 6/1965 | Ball............................ | 340/248 R X |
| 3,329,869 | 7/1967 | Obenhaus........................ | 317/13 C |
| 3,404,313 | 10/1968 | Happel et al...................... | 317/40 R |
| 3,705,286 | 12/1972 | Kondo et al. ..................... | 219/69 C |
| 3,746,930 | 7/1973 | Van Best et al. ................. | 324/54 X |
| 3,793,559 | 2/1974 | Ristuccia...................... | 317/40 R X |

Primary Examiner—James R. Scott
Assistant Examiner—William J. Smith
Attorney, Agent, or Firm—Kenyon & Kenyon Reilly Carr & Chapin

[57] ABSTRACT

An arrangement for detecting dielectric breakdowns in a metal-clad, high-voltage installation made up of a plurality of component sections includes a thermal sensor for each of the sections wherein a dielectric breakdown may occur for sensing the temperature. The output of the thermal sensors feed a comparator which forms an output signal from at least two discrete signals from the thermal sensor. A circuit arrangement corresponding to the comparator identifies the thermal sensor associated with the component section wherein a dielectric breakdown has occurred.

8 Claims, 6 Drawing Figures

ARRANGEMENT FOR DETECTING DIELECTRIC BREAKDOWNS IN METAL-CLAD HIGH-VOLTAGE SWITCHING AND TRANSMISSION INSTALLATIONS

BACKGROUND OF THE INVENTION

The invention relates to an arrangement for detecting dielectric breakdowns in metal-clad, high-voltage switching and transmission systems equipped with several gastight compartmentalized sections. The detecting arrangement determines the faulty section with at least one stationary measuring device.

A compressed-gas-insulated high-voltage switching installation with an arrangement for monitoring the gas pressure is described in the journal *Revue Generale De L'Electricite*, April 1966, at pages 493 to 500; this arrangement causes the system to shut down at pressures higher than the operating pressure. Here, however, the danger to the system caused by the occurrence of a fault cannot be determined with more accuracy, than to distinguish, for instance, between an increase in pressure because of a temperature change caused by heating as a consequence of normal load or, as a consequence of a fault arc.

In the Deutsche Offenlegungsschrift 1,665,637 a compressed gas-insulated high-voltage switching installation is described which includes an arrangement for monitoring the gas pressure and causes the system to shut down at pressures higher than the operating pressure. As the criterion for switching the system off, the rate of change of the gas pressure is taken into consideration here. In this manner, normal operation can be distinguished from fault situations after the monitoring device has responded.

In both known arrangements, direct access to the interior of the installation must be provided so that the pressure prevailing there can be fed to the measuring device, for example, a pressure transducer. Equipping an already existing high-voltage switching and transmission installation is very expensive because of the work required to empty and fill the encapsulation and because of the installation of the measuring device in a gastight manner.

SUMMARY OF THE INVENTION

In view of the foregoing, it is an object of the invention to provide an arrangement for detecting dielectric breakdowns which can be installed with only little effort in already existing systems. It is another object of the invention to provide such an arrangement wherein access to the interior of the encapsulation is avoided.

These objects are realized in the arrangement according to the invention by providing detection means in the form of a measuring device such as a thermal sensor that is coupled on the outside to the component section and measures the temperature of the encapsulation. The outputs of the thermal sensors feed a comparator which forms an output signal from at least two discrete thermal sensor signals and with which a circuit arrangement identifying the thermal sensor is associated.

With the arrangement according to the invention, metal-clad, high-voltage switching and transmission installations can be retrofitted with an arrangement for detecting dielectric breakdowns without the necessity of having to take the high-voltage switching installation out of operation for this purpose. The criterion for the occurrence of a dielectric breakdown is the rise in temperature resulting from the breakdown during the burning time of the arc; this action manifests a characteristic different from that of a temperature rise caused by an increase in the ambient temperature or an increase in electrical load such as is expected in normal operation.

In a first advantageous embodiment of the arrangement according to the invention, the thermal sensor is connected with a circuit arrangement which measures temperature gradients and passes the thermal sensor signal only above a given value of the temperature gradient. In this manner, a single, stationary measuring device per component section is sufficient in high-voltage switching and transmission installations, particularly with several identically constructed, gastight compartmentalized sections. It is particularly advantageous if the circuit arrangement contains a timing device which interrupts the measuring signal periodically and a memory storing the measurement signal up to one clock period, the arrangement being constructed so that the timer feeds one input each of a NAND gate provided as a comparator directly and the memory through an element switching synchronously with the timer.

If the sections of a metal-clad, high-voltage switching and transmission installation are of dissimilar configuration, two measuring devices are preferably provided for each component section, the two measuring devices being arranged at points physically separated from each other of the encapsulation, and together feed an Exclusive-OR gate as a comparator. In this embodiment of the arrangement according to the invention, cognizance is taken of the fact that, in the event of a dielectric breakdown, the arc begins to travel because of the formation of loops, the velocity of travel increasing with increasing current. A detection arrangement equipped with two measuring devices per section is therefore capable of determining the location of all important breakdowns in practical operation.

To reliably detect all arcs occurring in high-voltage switching and transmission installations with components sections of different shapes, it is preferable to provide three measuring devices for each section and to arrange these measuring devices at locations of the enclosure physically separated on a circle, whose center lies outside of the developed area of the section to be covered. In this way, it is assured that an arc occurring at any point of the encapsulation leads to an unequivocal signal of the comparator, as at least one of the measuring devices delivers a signal differing from the other two measuring devices.

Although the invention is illustrated and described herein as arrangement for detecting dielectric breakdowns in metal-clad high-voltage switching and transmission installations, it is nevertheless not intended to be limited to the details shown, since various modifications may be made therein within the scope and the range of the claims. The invention, however, together with additional objects and advantages will be best understood from the following description and in connection with the accompanying drawings.

DESCRIPTION OF THE PREFERRED EMBODIMENTS OF THE INVENTION

Figure 1:
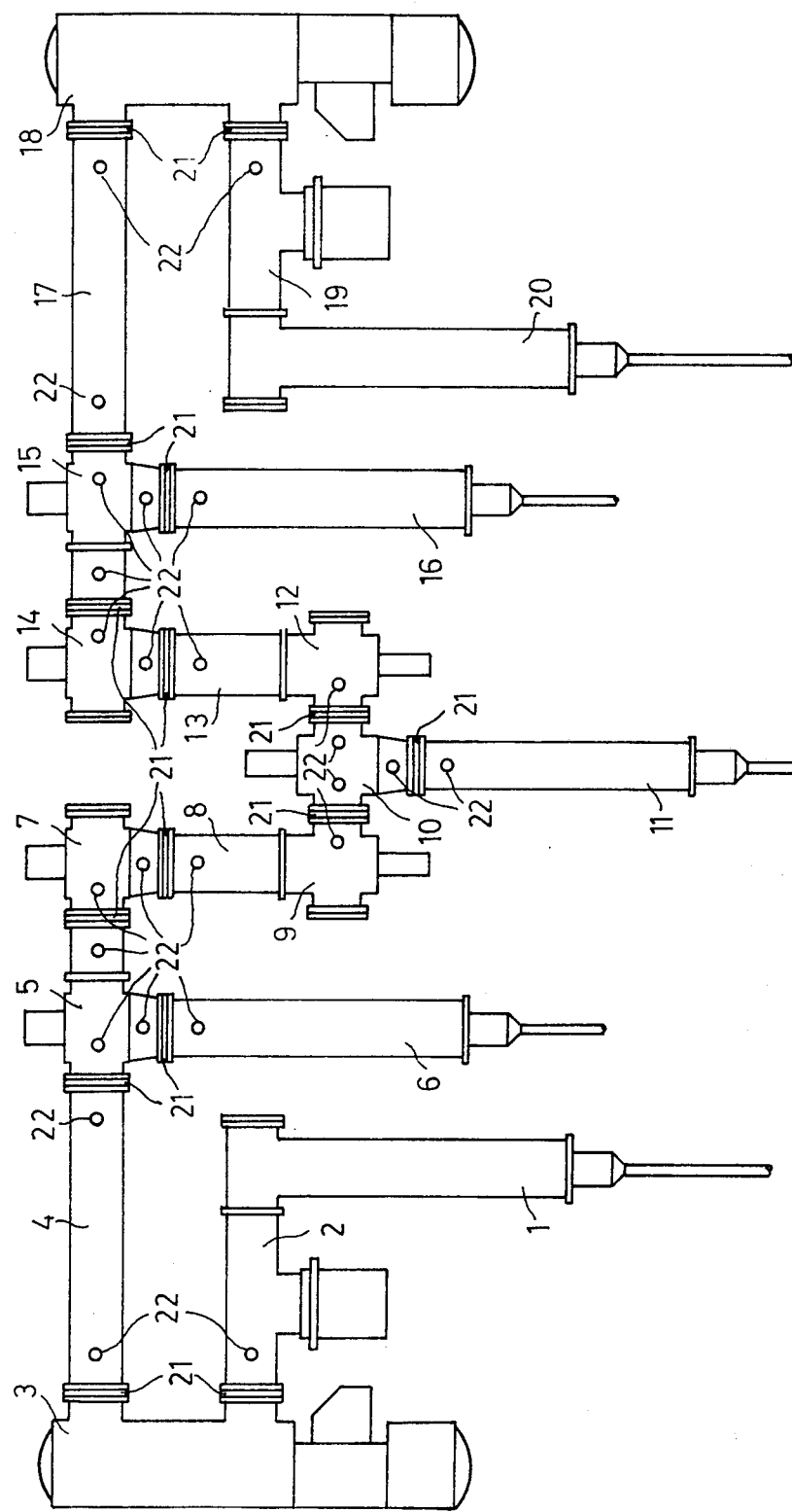
FIG. 1 is a schematic diagram showing a high-voltage installation equipped with the detection arrangement according to the invention.

The metal-clad high-voltage switching installation of FIG. 1 includes an outgoing cable 1, a line disconnect switch 2 connected therewith which leads to a power circuit breaker 3, and a tubular conductor configured as a coupled section 4. The coupling section 4 is connected with the power circuit breaker 3 and leads to a load disconnect switch 5. The load disconnect switch 5 is connected on one side with a transformer branch circuit 6 and on the other side with a further load disconnect switch 7 which acts as a series disconnect switch and in turn is connected through a grounding device 8 with a disconnect switch 9 and through the latter, with a load disconnect switch 10.

The load disconnect switch 10 is connected on the one hand with a transformer branch 11 and on the other hand with a disconnect switch 12, which is connected in turn via a grounding device 13, a load disconnect switch 14 acting as a series disconnect switch and a load disconnect switch 15 with a further outgoing transformer circuit 16 on the one hand, and with a tubular conductor 17 constructed as a coupling section, on the other hand. The tubular conductor 17 is connected with a power circuit breaker 18, whose other connection is connected with an outgoing cable 20 through a line disconnect switch 19.

At the locations 21 are located bulkheads which subdivide the high-voltage switching installation into several sections which are separated from each other in a gastight and arc-resistant manner. In order to be able to identify the faulty section in the metal-clad high-voltage switching installation after a dielectric breakdown has occurred, each fault-prone section is provided with at least one thermal sensor as a measuring device. The measuring device is always designated with reference numeral 22. An arc forming as a result of dielectric breakdown causes an increase of the temperature in the region of the foot point of the arc at the encapsulation, which differs substantially from temperature increases due to operational conditions. The temperature rise detected by the measuring device furnishes the criterion for the presence of a dielectric breakdown in the high-voltage switching installation.

Figure 2:
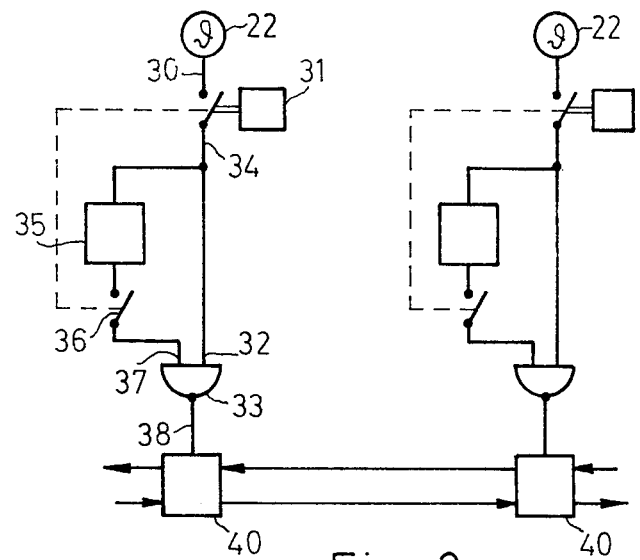
FIG. 2 is an electric schematic diagram of the arrangement according to the invention showing the interconnections of the components which make up the detection arrangement according to one embodiment of the invention.

In FIG. 2, a temperature sensor 22 is mounted on the outside at a section of the encapsulation and delivers at its output a thermal sensor signal corresponding to the respective encapsulation temperature. The output 30 of the thermal sensor 22 is connected with the timing device (clock) 31, which periodically interrupts the measuring signal delivered at the output 30. In this manner, pulses of predetermined duration with predetermined intervals are fed to the input 32 of a NAND gate 33. The line 34 connected with the input 32 of the NAND gate 33 feeds the periodically clocked measuring signal to a memory 35, which holds the measuring signal for up to one clock period and thus permits a comparison of two successive measuring signals. The memory 35 is connected with the other input 37 of the NAND gate 33 through an element 36 which switches synchronously with the clock 31. At the output 38 of the NAND gate a signal is delivered only if the amplitude of the clocked measuring signal changes by a given amount.

Figure 5:
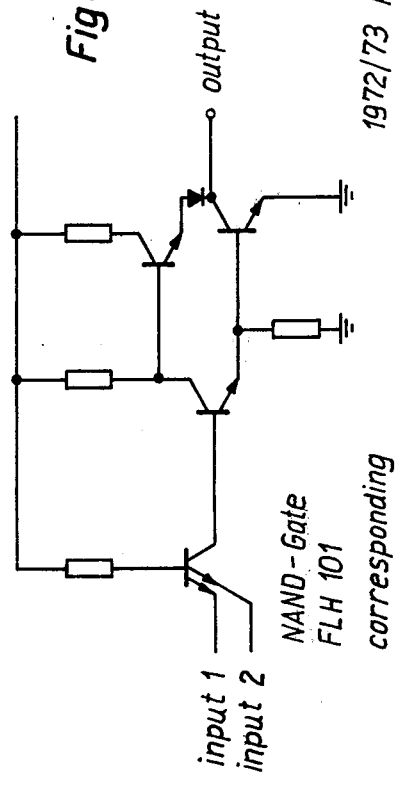
FIG. 5 is a schematic diagram of the comparator of the embodiment of FIG. 2 configured as a NAND-Gate and equipped with a threshold switch.

FIG. 5 shows how the comparator 33 of FIG. 2 can be equipped with a threshold switch 39 for responding to a temperature gradient which exceeds a predetermined value indicative of a dielectric breakdown in the corresponding component section.

The arrangement shown in FIG. 2 thus detects the temperature gradient and, with aid of a threshold switch, can be configured in such a manner that the thermal sensor signal is passed on to circuit means in the form of a switching device 40 identifying the termal sensor only above a given value of the temperature gradient.

Figure 6:
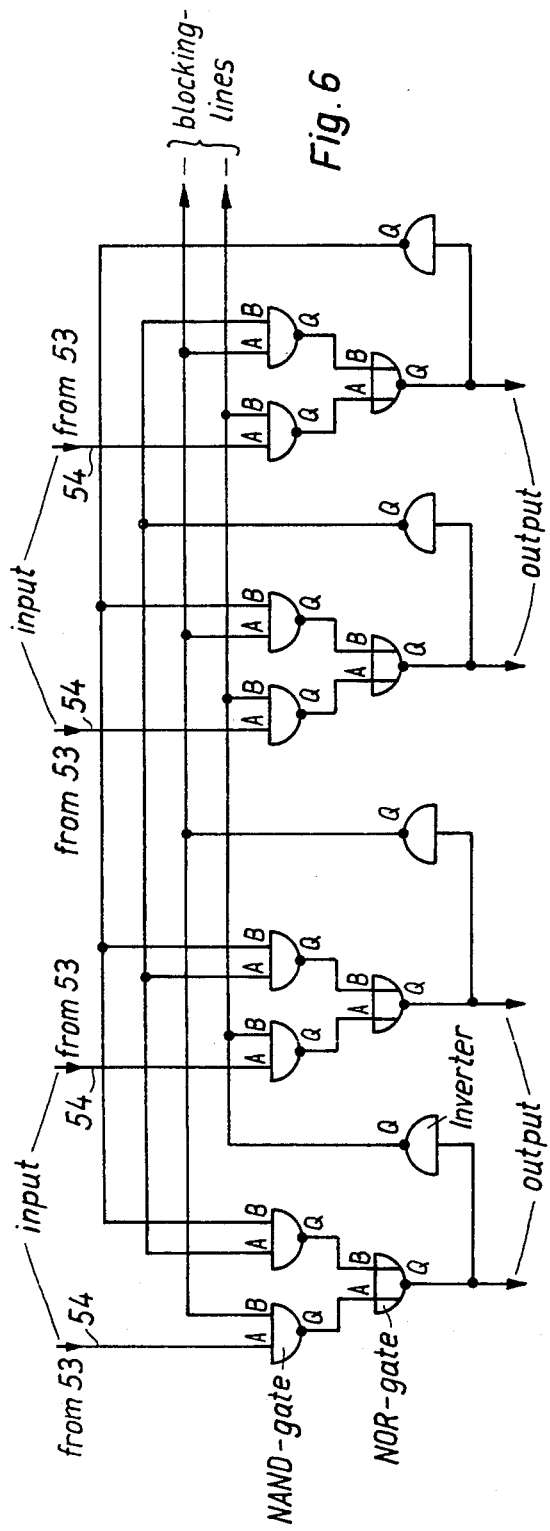
FIG. 6 is a block schematic diagram of the switching device of the embodiment of FIG. 2 for identifying the thermal sensor corresponding to a faulted component section of the high-voltage installation.

In the simplest case, the switching device 40, which identifies the thermal sensor, consists of a logic circuit interlinking all outputs 38 which, after the occurrence of a signal on one of its lines 38, blocks the transmission of all signals occurring on the other lines 38. In this manner, an unequivocal statement is obtained regarding the location of the dielectric breakdown in the metal-clad high-voltage switching and transmission installation. The logic circuit of the switching device 40 can be configured, for example, as shown in the block diagram of FIG. 6.

Variations of the ambient temperature as well as temperature fluctuations because of load changes are not utilized for the formation of a measuring signal because they do not exceed a predetermined value of the temperature gradient but are suppressed by the NAND gate. In this connection, cognizance is taken of the fact that in practical rated operation, the temperatures at the encapsulation varies between −10° and +70°C while, in the presence of dielectric breakdowns, the encapsulation temperature may be up to 600°C in extreme cases.

Figure 3:
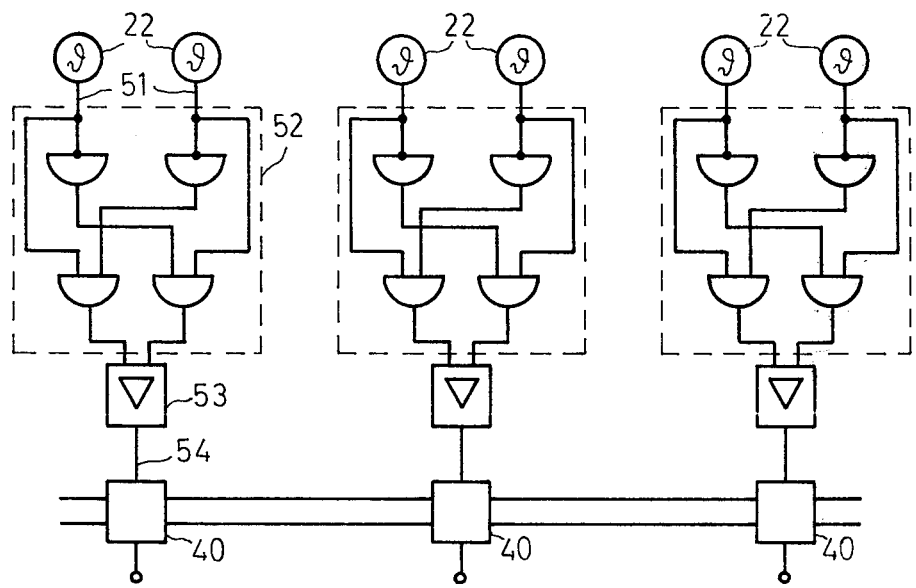
FIG. 3 illustrates an alternate embodiment of the detection arrangement according to the invention wherein at least two detectors are provided for each section of the switching installation being monitored.

The block diagram of FIG. 3 shows two thermal sensors 22 provided for each encapsulation section. Each pair of these sensors can, for example, be arranged in a bridge circuit. The outputs 51 of the thermal sensors 22 are connected in this case to an interlinking logic circuit 52 which presents an Exclusive-OR condition, more specifically, a signal is delivered at the output of the logic circuit 52 only if the signals present at the outputs 51 of the thermal sensors 52 is fed to an amplifier 53, whose output 54 is connected to a switching device 40 identifying the two thermal sensors. This identifying device 40 operates in a manner similar to that explained in connection with FIG. 2.

Figure 4:
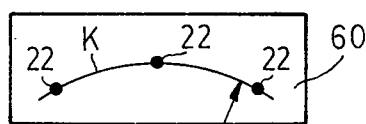
FIG. 4 shows a developed surface of one section of the high-voltage installation equipped with three detectors according to still another embodiment of the invention.

FIG. 4 shows the development of an area 60 of a section whereat detection is to be made and to which three measuring devices are to be coupled on the outside thereof. The three measuring devices 22 are arranged at the encapsulation physically separated from each other. They lie on a circular arc K, whose center lies outside the developed area of the section to be covered. In an extreme case, the center, relative to the area to be covered, is at infinity, that is, the curve connecting the three measuring devices is a straight line. The measuring devices arranged in the manner indicated according to FIG. 4 can be connected either to a circuit arrangement detecting temperature gradients as explained in connection with FIG. 2, or with a logic circuit which is constructed so that it furnishes an output signal only if the three measuring signals are not equal.

The arrangement for the detection of dielectric breakdowns shown in connection with a high-voltage switching installation of the kind shown in FIG. 1 can, of course, find application also in high-voltage transmission installations which are to be monitored by remote control. The essential advantage of the arrangement for the detection of dielectric breakdowns according to the invention is that metal-clad high-voltage switching and transmission installations can be built as unmanned stations and can be remotely monitored and controlled from a physically distant central point.

What is claimed is:

1. An arrangement for detecting dielectric breakdowns in a metal-clad, high-voltage installation such as an equipment suitable for switching and transmitting high-voltages made up of a plurality of component sections sealed gastight one with respect to the other, the arrangement comprising: detection means at each of at least a portion of the component sections for detecting the temperature thereat and for providing a first quantity indicative of said temperature, ancillary means for providing a second quantity indicative of the temperature at the component section corresponding to said detection means; and comparator means for receiving and comparing said first and second quantities to form an output signal therefrom for indicating the occurrence of a dielectric breakdown in the corresponding component section.

2. The arrangement of claim 1 wherein said detection means, said ancillary means and said comparator means conjointly constitute a breakdown detection device, and wherein a plurality of said breakdown detection devices are provided for corresponding ones of the component sections, said arrangement further comprising: circuit means for receiving the output signal of the comparators corresponding to respective ones of said breakdown detection devices and for identifying the breakdown detection device issuing an output signal indicative of a dielectric breakdown in the component section corresponding thereto.

3. The arrangement of claim 2, said circuit means including means for detecting the output signal of a detection device corresponding to a component section wherein a dielectric breakdown has occurred and for blocking the outputs of the remaining ones of said detection devices whereby a definitive statement is obtained for identifying the faulted component section.

4. The arrangement of claim 2, said detection means being a thermal sensor mounted on the outer surface of the metal enclosure of the corresponding component section, said comparator having first and second inputs, said ancillary means including: storage means for receiving and storing said second quantity; first switching means for alternately switching the output of said thermal sensor to said first input and to said storage means whereby said second quantity is obtained and fed into said storage means; and second switching means for switching said second quantity into said second input from said storage means when said first switching means switches the output of said thermal sensor to said first input thereby obtaining said first quantity from said thermal sensor and feeding the same into said first input, said first and second quantities defining a voltage gradient indicative of a temperature change occurring between the times at which said first and second quantities were sensed; and said comparator means comprising threshold means for responding to said temperature gradient when the same exceeds a predetermined value indicative of a dielectric breakdown in the corresponding component section.

5. The arrangement of claim 4, said comparator means comprising a NAND-Gate having said first and second inputs, said ancillary means comprising a clock for periodically actuating said first switching means and said second switching means whereby said first and second quantities are fed to said first and second inputs, respectively, of said NAND-Gate, said storage means being a memory for storing said second quantity for up to one clock period.

6. The arrangement of claim 4, said detection means comprising at least three thermal sensors mounted at the corresponding component section, said thermal sensors being arranged on a curve at respective locations on the metal enclosure spatially separated one from the other, the curve having a center located outside the developed area of the component section to be covered.

7. The arrangement of claim 2, said detection means being a first thermal sensor, said ancillary means comprising an ancillary sensor, said thermal sensors being coupled to the corresponding component section at respective mutually spaced locations thereof, said comparator means being a comparator configured to provide an Exclusive-OR condition, and said first thermal sensor and said ancillary sensor being connected to said comparator for conjointly supplying said comparator with said first and second quantities.

8. The arrangement of claim 2, said detection means comprising at least three thermal sensors mounted at the corresponding component section, said thermal sensors being arranged on a curve at respective locations on the metal enclosure spatially separated one from the other, the curve having a center located outside the developed area of the component section to be covered.

* * * * *